United States Patent
Tubetto

(10) Patent No.: US 6,217,125 B1
(45) Date of Patent: Apr. 17, 2001

(54) SAFETY WHEEL ASSEMBLY

(76) Inventor: Louis Raymond Tubetto, 517 Hopi Pl., Boulder City, NV (US) 89005-3056

( * ) Notice: Subject to any disclaimer, the term of this patent is extended or adjusted under 35 U.S.C. 154(b) by 0 days.

(21) Appl. No.: 09/249,999

(22) Filed: Feb. 16, 1999

(51) Int. Cl.[7] .................................................. B60B 11/10
(52) U.S. Cl. ........................................ 301/40.3; 301/40.2
(58) Field of Search ................................ 301/36.1, 35.62, 301/38.1, 39.1, 40.1, 40.2, 40.3, 41.1, 105.1, 13.2

(56) References Cited

U.S. PATENT DOCUMENTS

| | | | |
|---|---|---|---|
| 1,639,536 | * | 8/1927 | Saives .................................. 301/40.1 |
| 1,712,322 | * | 5/1929 | Bachrach ........................... 301/35.62 |
| 1,721,278 | * | 7/1929 | Nelson ................................ 301/36.1 |
| 1,807,167 | * | 5/1931 | Nelson ................................ 152/36.1 |
| 1,860,665 | * | 5/1932 | Eksergian ........................... 301/35.62 |
| 1,908,024 | * | 5/1933 | Keller .................................. 301/105.1 |
| 1,934,971 | * | 11/1933 | Eksergian ............................ 301/36.1 |
| 2,014,247 | * | 9/1935 | Eksergian et al. ................. 301/35.62 |
| 2,288,474 | * | 6/1942 | Manning ............................. 301/36.1 |
| 2,343,129 | * | 2/1944 | Ash ..................................... 301/36.2 |
| 2,386,030 | * | 10/1945 | Ash ..................................... 301/36.1 |
| 2,486,569 | * | 11/1949 | Malthaner .......................... 301/36.1 |
| 2,516,896 | * | 8/1950 | Manning ........................... 301/35.62 |
| 2,552,034 | * | 5/1951 | Canady et al. ..................... 301/36.1 |
| 2,635,012 | * | 4/1953 | Rappaport .......................... 301/36.1 |
| 2,636,782 | * | 4/1953 | Canady et al. ..................... 301/36.1 |
| 2,670,246 | * | 2/1954 | Rosiers .............................. 301/40.1 |
| 2,807,507 | * | 9/1957 | Cook .................................. 301/36.1 |
| 3,068,049 | * | 12/1962 | Smith ................................. 301/36.1 |
| 3,328,088 | * | 6/1967 | Olson ................................. 301/36.1 |
| 3,532,384 | * | 10/1970 | Williams, Jr. ...................... 301/36.1 |
| 3,664,709 | * | 5/1972 | Barre .................................. 301/38.1 |
| 3,773,394 | * | 11/1973 | Grawey .............................. 305/38 |
| 3,790,218 | * | 2/1974 | Johns ................................. 301/36.1 |
| 3,829,163 | * | 8/1974 | Hans .................................. 301/35.62 |
| 3,935,891 | * | 2/1976 | McCloud et al. .................. 301/40.1 |
| 4,070,066 | * | 1/1978 | Reppert et al. ..................... 301/36.1 |
| 4,214,792 | * | 7/1980 | Hardwicket et al. .............. 301/36.1 |
| 4,220,372 | * | 9/1980 | Johansen et al. .................. 301/36.1 |
| 4,427,237 | * | 1/1984 | Beegle ............................... 301/36.1 |
| 4,585,276 | * | 4/1986 | Tirheimer .......................... 301/36.1 |
| 4,666,216 | * | 5/1987 | Smith ................................. 301/39.1 |
| 4,772,074 | * | 9/1988 | Brieser et al. ..................... 301/36.1 |
| 4,787,679 | * | 11/1988 | Arnold ............................... 301/36.1 |
| 4,818,031 | * | 4/1989 | Brown ................................ 301/36.1 |
| 4,822,108 | * | 4/1989 | Benhart ............................. 301/36.1 |
| 4,887,685 | * | 12/1989 | Shepard et al. .................... 301/36.1 |
| 5,056,871 | * | 10/1991 | Sbarro ............................... 301/36.1 |
| 5,100,205 | * | 3/1992 | Hardwicke ........................ 401/36.1 |
| 5,407,255 | * | 4/1995 | Feldman ........................... 301/39.1 |
| 5,458,174 | * | 10/1995 | Wessel .............................. 152/210 |
| 5,676,437 | * | 10/1997 | Holmgren et al. ................. 305/180 |
| 5,906,418 | * | 5/1999 | Cullen ............................... 301/36.1 |
| 5,921,642 | * | 7/1999 | Tschida ............................. 305/180 |

\* cited by examiner

Primary Examiner—S. Joseph Morano
Assistant Examiner—Long Bao Nguyen
(74) Attorney, Agent, or Firm—Dennis W. Beech

(57) ABSTRACT

The safety wheel assembly uses spacer mounting nuts to allow the mounting of a spare or second wheel and tire on an existing motor vehicle wheel mount assembly. The primary wheel and tire of a vehicle are normally mounted using lug or mounting bolts. These bolts are then used to secure the primary tire with the spacer mounting nut which thereby provides for mounting the spare wheel and tire outwardly of the primary wheel relative to the vehicle. The two tires and wheels are spaced such as not to contact one to the other. The spare tire is a smaller diameter than the primary wheel. For example the standard size spare tire of solid rubber may be mounted in such a position as such spare tires are of a smaller diameter. The spare tire may also have protruding elements on the tire surface to aid in travel under snow conditions.

1 Claim, 2 Drawing Sheets

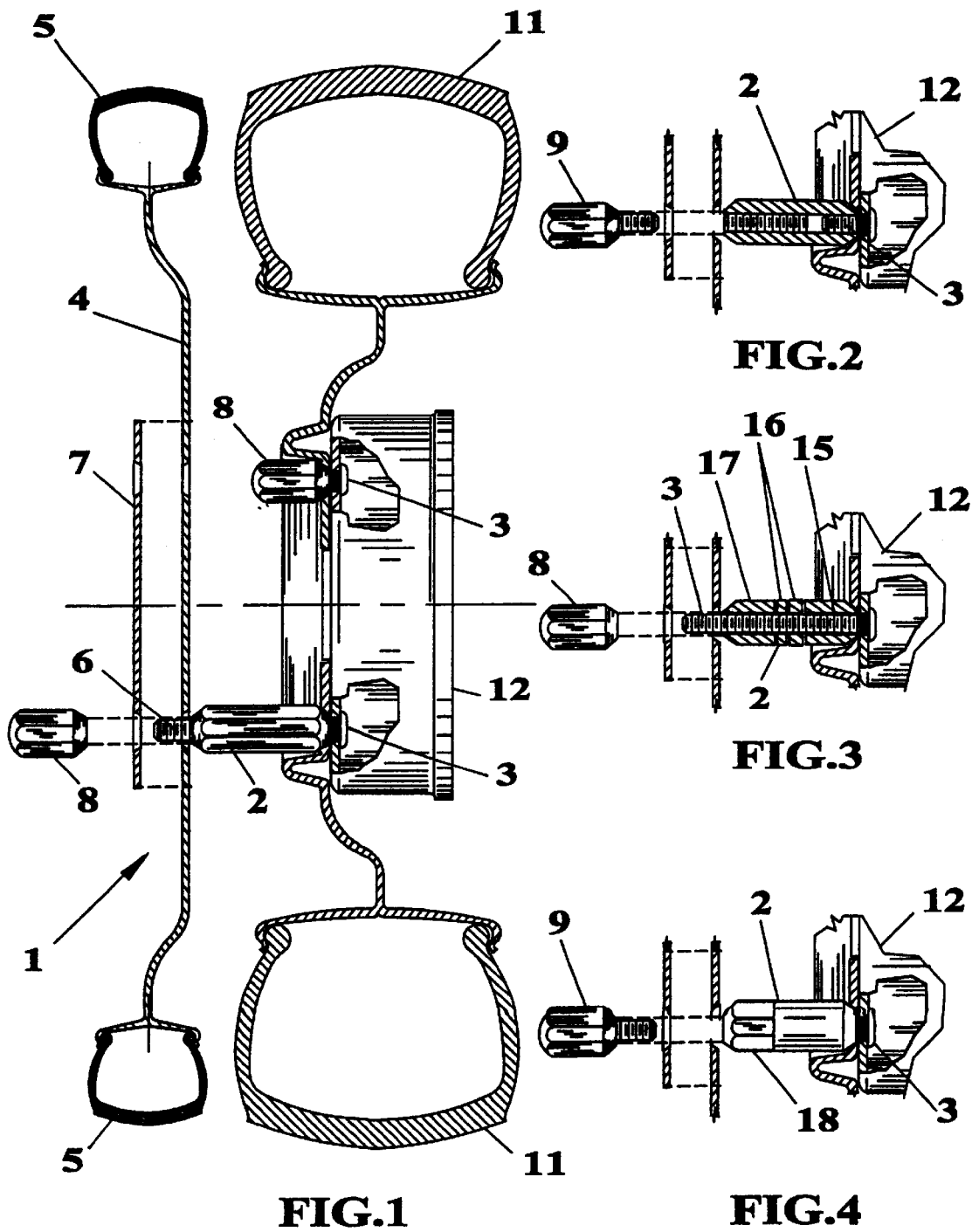

SAFETY WHEEL ASSEMBLY

BACKGROUND OF THE INVENTION

1. Field of the Invention

This invention relates to apparatus used to attach a second or spare wheel at the position of a first wheel of a motor vehicle. The new system provides a means to mount a second wheel on existing or substitute wheel mounting bolts such that the second wheel is in position to support the motor vehicle should the primary wheel tire lose pressure.

2. Description of Related Art

There are currently known assemblies for mounting dual tires at an axle end of a motor vehicle. Representative examples include U.S. Pat. No. 1,712,322, issued Aug. 30, 1928 and U.S. Pat. No. 2,552,034, issued May 8, 1951. The first disclosure includes the mounting of an auxiliary or spare tire adjacent the motor vehicle primary tire. The wheel assemblies are mounted abutting or adjacent each other in order to use the vehicle existing wheel mounting bolts. The spare wheel is flared out to provide clearance between the primary and spare tires. The spare wheel and tire are mounted interior to the primary wheel adjacent the brake drum. This design permits mounting the spare wheel and tire without the need for extended wheel mounting bolts or retaining nuts. Plate clips are additionally used to attach the two wheels.

The second disclosure (U.S. Pat. No. 2,552,034) includes a dual primary wheel assembly rather than use of a primary wheel and smaller diameter spare wheel. Again the two wheel assemblies are mounted abutting or adjacent each other and thereby may use existing type mounting bolts. A special two piece retaining bolt assembly is used to firmly secure the wheels to the brake drum. No spacing devices such as extended retaining nuts between the wheels are disclosed.

SUMMARY OF THE INVENTION

One object of the present invention is accommodating the mounting of a spare or second tire collocated with a motor vehicle primary tire. Another object is to facilitate the mounting such that the existing vehicle wheel mounting bolts may be used to attach the spare tire. A further object is to allow use of the collocated spare tire as an aid to tire traction when driving in snow conditions.

In accordance with the description presented herein, other objectives of this invention will become apparent when the description and drawings are reviewed.

BRIEF DESCRIPTION OF DRAWINGS

FIG. 1 illustrates a cross section side elevation view of the primary and spare tire mounting system.

FIG. 2 illustrates a cross section view of the spacer mounting bolt.

FIG. 3 illustrates a cross section view of an alternate spacer mounting bolt.

FIG. 4 illustrates a spacer mounting bolt with an end portion having flat surfaces for rotating the bolt.

DESCRIPTION OF PREFERRED EMBODIMENT

Figure 5:
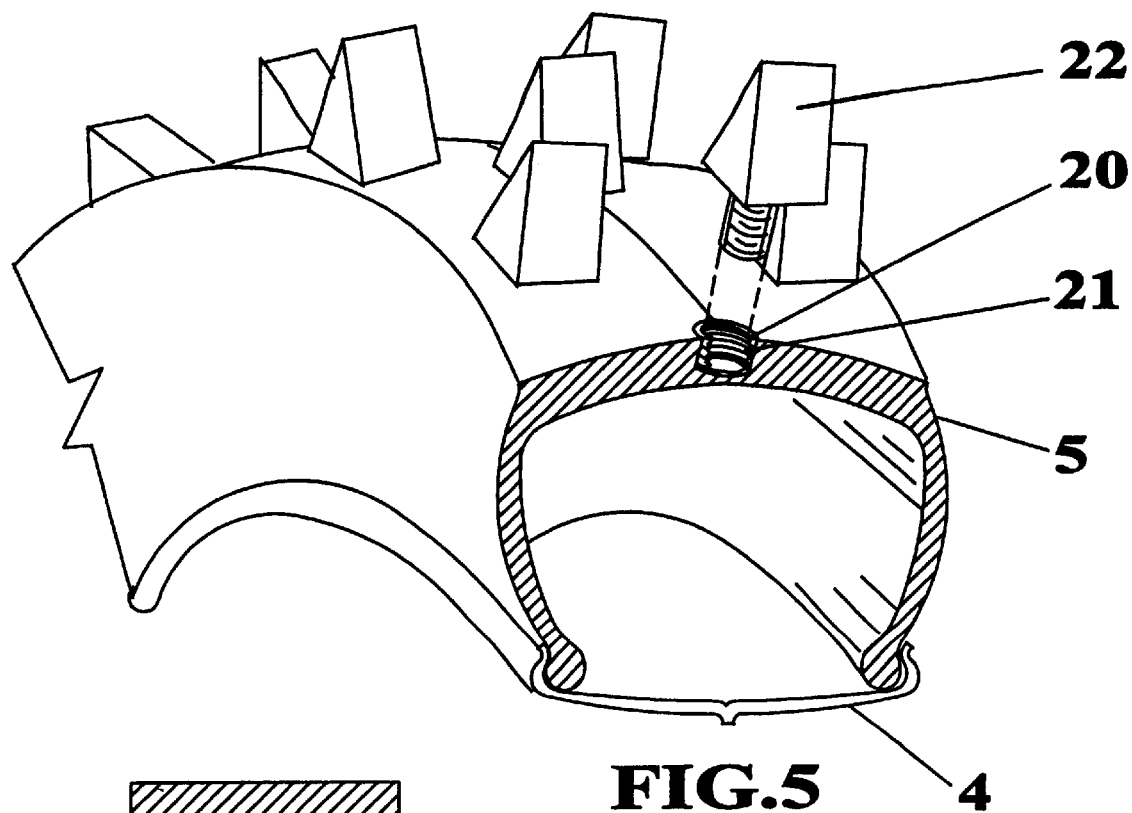
FIG. 5 illustrates a tire with bushings molded in the tire to receive protruding elements.

The safety wheel assembly (1) involves use of an existing motor vehicle primary wheel mounting location for attachment of a second or spare tire. The spare tire is mounted outward of the primary tire relative to the vehicle. To allow use of existing spare tire structures spacer mounting nuts are used to extend the existing vehicle wheel mounting bolts. A spare tire so located may also be used to provide traction when operation the vehicle in snow conditions.

Referring to FIGS. 1 through 4, a spacer mounting nut (2) is threaded onto an existing vehicle wheel mounting bolt (3). The spare wheel (4) with tire (5) is then attached to the spacer mounting nut (2) by a variety of means. In FIG. 1 a threaded shaft (6) is threaded into the spacer mounting nut (2) opposite the wheel mounting bolt (3). The spare wheel (4) with support plate (7) is then mounted on the threaded shaft (6) and secured by a standard mounting nut (8).

Referring to FIG. 2, the spacer mounting nut (2) is again used to extend the wheel mounting bolt (3) attachment means. In this embodiment a standard mounting bolt (9) is used to secure the wheel. In each of these embodiments the initial positioning of the space mounting nut secures the primary wheel (10) and tire (11) to the brake drum (12).

In FIG. 3, the spacer mounting nut (2) has been constructed such that separate elements of a wheel bolt (15), washers (16) and sleeve (17) are used to mount the spare wheel (4). In this embodiment a wheel mounting bolt (3) of lengthened lateral dimension has been fixed to the brake drum (12). The wheel bolt (15) is threaded onto the wheel mounting bolt (3) to secure the primary wheel (10). The washers (16) may be mounted on the wheel mounting bolt (3) to provide the desired spacing between wheels and tires. Finally the sleeve (17) is mounted on the wheel mounting bolt (3). The sleeve (17) may or may not be threaded. Following this the spare wheel (4) is mounted as previously disclosed.

FIG. 4 illustrates a spacer mounting nut (3) formed from cylindrical material with only an end portion (18) formed to aid in rotation of the nut.

Figure 6:
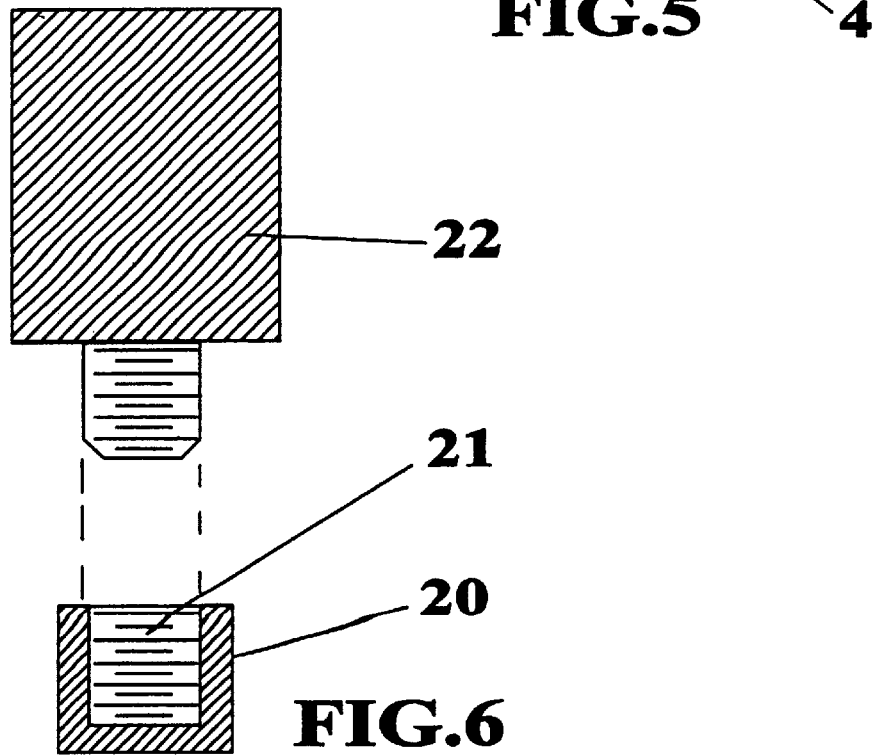
FIG. 6 illustrates a cross section view of a bushing and protruding element.

Referring to FIGS. 5 and 6, use of the spare wheel (4) as an aid to traction in snow conditions is presented. In this embodiment there are bushings (20) molded into the face of the spare tire (5). The bushings (20) have internal threads (21) into which protruding elements (22) are threaded. In snow conditions the primary tire (11) will normally sink in the snow such that the protruding elements (22) of the relatively smaller diameter spare tire (5) may engage the snow surface to aid in traction.

What is claimed is:

1. A system for mounting a spare tire adjacent to a primary tire of a motor vehicle comprising:

a plurality of spacer mounting nuts threadable onto a vehicle wheel mounting bolt;

the spacer mounting nut of sufficient length to separate a spare tire and a primary tire; and a plurality of mounting bolts inserted through the spare tire engaging the spacer mounting nuts.

* * * * *